United States Patent [19]

Seidel et al.

[11] Patent Number: 5,649,474
[45] Date of Patent: Jul. 22, 1997

[54] APPARATUS FOR THE PREPARATION OF DOUGH PORTIONS FOR BAKING

[76] Inventors: Klaus Seidel, Drosselweg 40, 8960 Kempten; Erwin Druckmiller, Hohenwartstrasse 10, 8952 Marktoberdorf, both of Germany

[21] Appl. No.: 335,771

[22] PCT Filed: May 6, 1993

[86] PCT No.: PCT/EP93/01111

§ 371 Date: Nov. 8, 1994

§ 102(e) Date: Nov. 8, 1994

[87] PCT Pub. No.: WO93/22927

PCT Pub. Date: Nov. 25, 1993

[30] Foreign Application Priority Data

May 8, 1992 [DE] Germany .................. 42 15 146.5

[51] Int. Cl.$^6$ .................. A21C 3/00; A21C 9/08; A21C 13/02; A21B 7/00
[52] U.S. Cl. .................. 99/352; 99/427; 99/443 C; 99/467; 99/477
[58] Field of Search .................. 99/352–355, 443 R, 99/443 C, 447, 467, 474–479, 644, 427; 126/21 A, 20, 19 M, 19 R, 21 R, 273 R; 34/208, 242, 191, 225; 432/242–244, 200; 219/388, 386, 400, 401

[56] References Cited

U.S. PATENT DOCUMENTS

| 4,015,519 | 4/1977 | van Elten et al. | 99/644 X |
| 4,450,400 | 5/1984 | Gwy | 320/2 |
| 4,590,916 | 5/1986 | Konig | 126/21 A |
| 4,892,083 | 1/1990 | Konig | 99/443 R |
| 4,984,557 | 1/1991 | Konig | 99/352 |

FOREIGN PATENT DOCUMENTS

| 234612 | 7/1964 | Austria . |
| 391402B | 10/1990 | Austria . |
| 2194109 | 2/1974 | France . |
| 549132 | 7/1933 | Germany . |
| 2249381 | 2/1974 | Germany . |
| 8014983 | 11/1980 | Germany . |
| 295604A5 | 10/1983 | Germany . |
| 3712372 | 10/1987 | Germany . |
| 7005305 | 10/1971 | Netherlands . |
| 1687199A1 | 10/1991 | U.S.S.R. . |

OTHER PUBLICATIONS

German Search Report dated Dec. 7, 1992.
PCT/EP International Search Report dated Aug. 27, 1993.

*Primary Examiner*—Timothy F. Simone
*Attorney, Agent, or Firm*—Arnold, White & Durkee

[57] ABSTRACT

Apparatus for preparing dough prior to baking houses stacks of dough carriers arranged side-by-side in one or more rows. The stacks are self-supporting. Drive mechanisms step the carriers upward within a stack and laterally between stacks. Downward movement within stacks is by gravity. Vertical movements are one carrier height at a time; lateral movements are one carrier width at a time. The overall movements may follow different modes. The apparatus may include a first dough rising station and a final dough rising station.

16 Claims, 9 Drawing Sheets

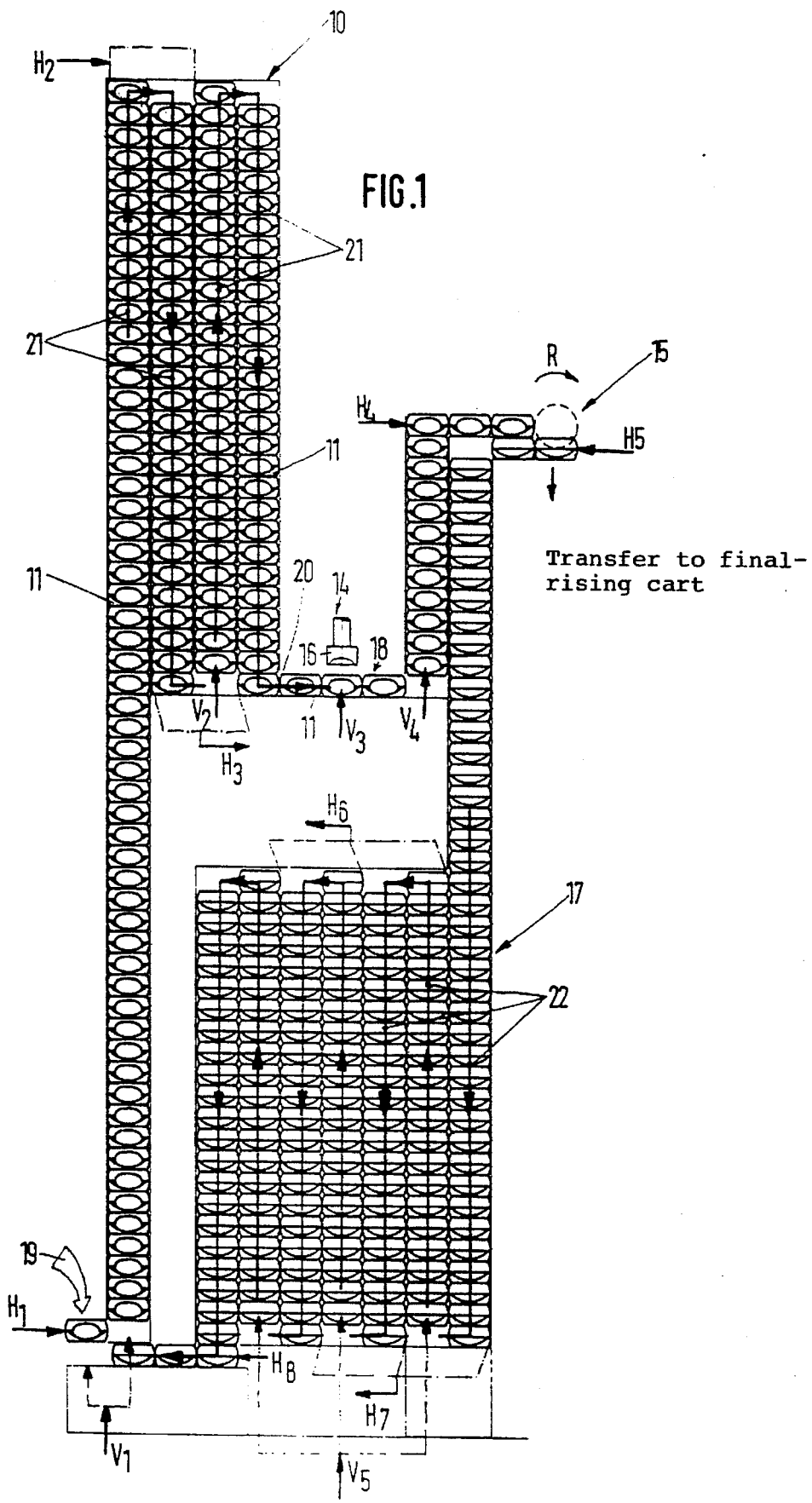

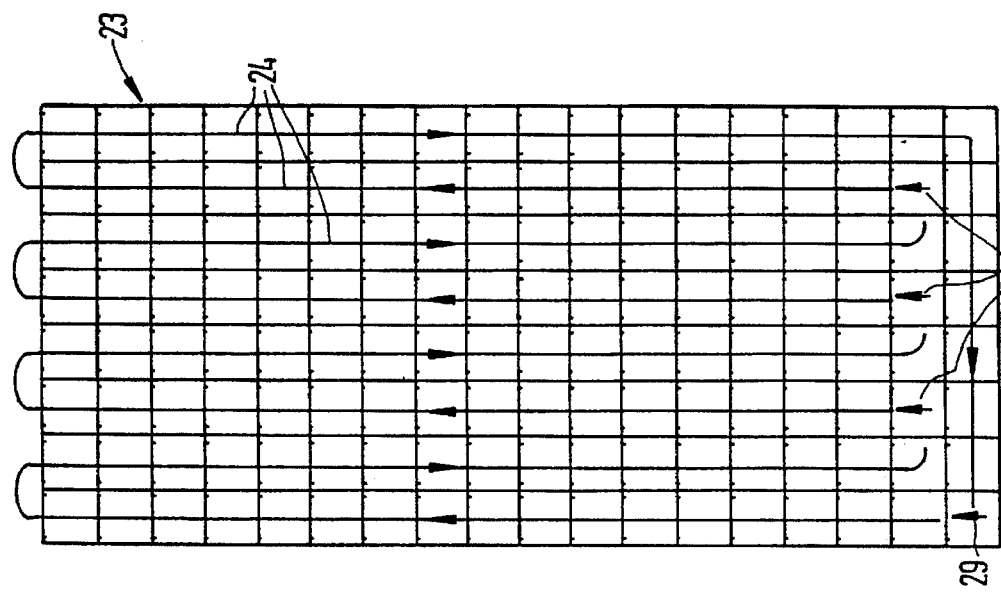
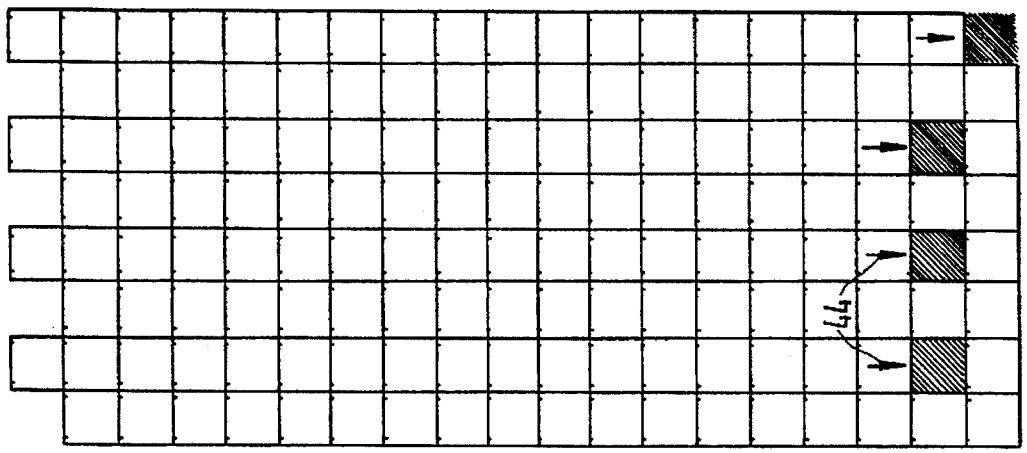
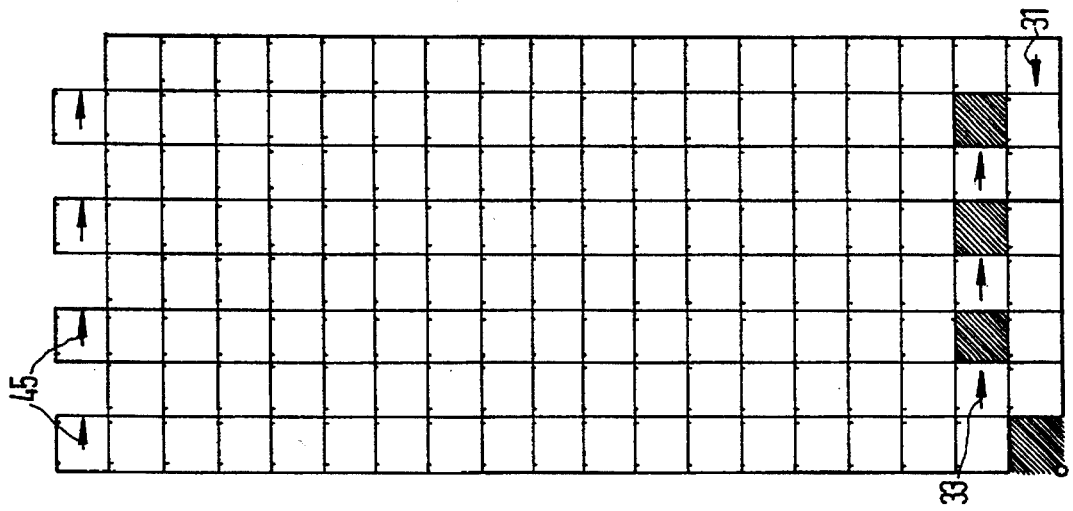

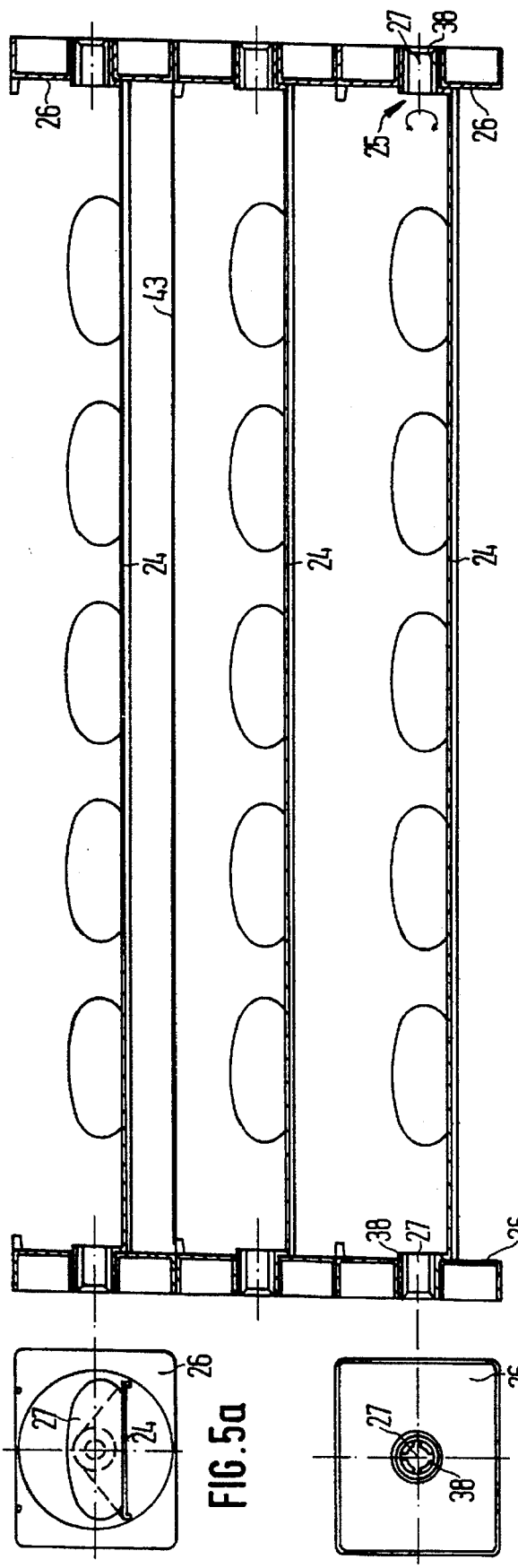

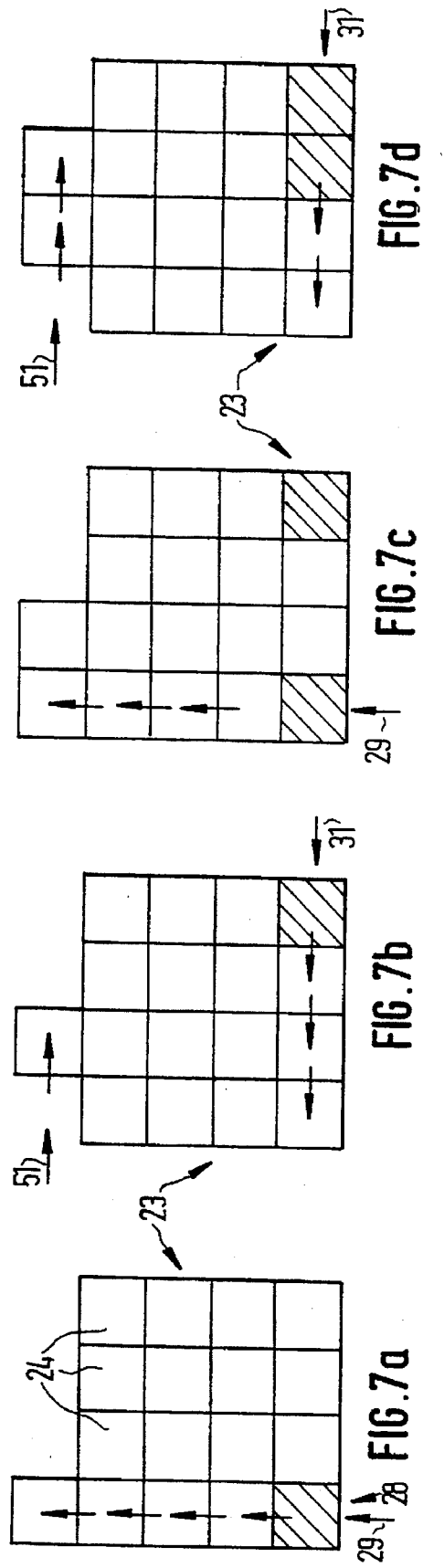

APPARATUS FOR THE PREPARATION OF DOUGH PORTIONS FOR BAKING

BACKGROUND OF THE INVENTION

1. Field of the Invention

The invention relates to an apparatus for the preparation of dough portions for baking.

2. Description of the Prior Art

Portions of dough, e.g. to produce bread rolls or the like, are conventionally placed by a so-called head machine into elongated pans for the first rising stage. These pans have five or more trough-like depressions to receive the portions of dough. The pans are customarily attached at their ends to two parallel transport chains, by a joint-like connection (allowing rotation about the long axis). The transport chains are uniformly driven forward and around corners by chain wheels. By arranging many pans in series, the dough can be passed through a first-rising cabinet at the desired rate of portions per hour. The time spent in the first-rising cabinet, which depends on the individual process, then determines the required machine volume.

After the first rising, the dough portions proceed to a shaping station, where a descending plunger indents them and simultaneously presses them into the trough-like depressions in the first-rising pans, giving the dough its specified shape. Immediately thereafter, in a mining station, the shaped dough portions are turned out onto flat carriers turning or onto a conveyor belt, where they rest with indented surface down and are taken to a separate room for the final rising process. After the final rising, the dough portions are again turned over by 180° and simultaneously set onto baking sheets, on which they are then carried into an oven. Because the first-rising pans are fixedly suspended from transport chains, which must be moved back and forth several times in the first-rising cabinet in order to remain there for the required time, e.g. about 8 minutes, while ensuring the desired throughput, the machine volume is necessarily large, with dead spaces and high assembly costs. Furthermore, the first-rising pans are ordinarily not removable, which makes cleaning them difficult and hygienically unsatisfactory.

In addition, because the first-rising pans are eventually moistened by the dough and if they are not removable, the whole installation must be shut down from time to time so that it can dry out. This means that the throughput claimed in the manufacturer's specifications is usually not achieved in practice. To avoid such inactive periods, the dough is customarily kept dry by chemical additives. This method is obviously not very acceptable.

Yet another problem with the conventional equipment is that after the final rising, which takes about 20 minutes, a laborious manual process is required to transfer the dough from the carriers to the baking sheets.

A baking and drying oven has been disclosed (DE-PS 549 132) in which baking pans that can be moved upward and downward and stacked up are transferred one after another through a rising area, a preliminary baking area and a final baking area. Each baking pan is pushed into the oven through an opening so as to occupy the lowest position in an upwardly moving stack of pans. The stack is raised in steps, after each of which the uppermost pan in the upwardly moving stack is pushed back onto a downwardly moving stack of baking pans, and the bottom pan in this stack is removed from the final baking area.

A baking and drying oven of this kind is not suitable for both the first and the final rising stages of baked goods and ordinarily requires the previous use of a separate apparatus in which the first rising occurs. The baking pans correspond to the baking sheets, which are manually introduced into the oven and must likewise be manually removed.

The patent DE-OS 22 49 381 discloses an automatic warming chamber in which a plurality of carriers are filled by hand, at an input site, with a plurality of rolls of dough. The filled carriers are subsequently arranged in a first stack. Stacks placed side by side are advanced toward a delivery unit by means of a horizontal displacement device, one stack-width at a time. The last stack is taken apart in a stepwise manner by means of a delivery apparatus, and at a delivery opening the fully risen rolls of dough are removed by hand. Prior to delivery the rolls of dough are indented by a human operator in a booth. The emptied carriers can then be sent back to the input site by way of a return conveyor, being dried and cleaned by appropriate devices on the way, so that the baking pans travel along a closed circuit.

Apparatus of this kind provides no opportunity for a first rising, nor can the baked goods be either turned over or shaped between first and final rising stages.

SUMMARY OF THE INVENTION

The present invention is directed to the problem of producing an apparatus for both first and final rising of dough portions that permits extremely compact construction and allows the important components, i.e. those that come into contact with the dough, to be cleaned without interrupting the operation of the apparatus.

This problem is solved in accordance with the invention as defined in the claims.

The construction in accordance with the invention is characterized with reference to the first rising stage by the employment of loose first-rising pans stacked densely above one another and side by side. As a result of the arrangement of first-rising pans in accordance with the invention and their transport in the first-rising region of the apparatus, dead space is practically completely avoided, so that the volume of the apparatus can be reduced to a minimum, substantially the volume of the first-rising pans that are necessarily present.

The first-rising pans are transported in a stepwise manner through the first-rising region. In this process certain pans, e.g. the lowest in a row, are raised or moved to the side by one step. The movement is transmitted to the neighboring pans by contact between the pans, e.g. by way of their end surfaces.

To shape the portions of dough, the construction in accordance with the invention, unlike the conventional equipment, also provides an opportunity to lift the first-rising pan with the dough portion it contains against a fixed indenting device. Furthermore, because of the manner of transport of the first-rising pans in accordance with the invention, the shaping and turning stations can also be more compactly constructed. The first-rising pans can be transported through the first-rising region along a meandering route or in rows or layers, as desired. In the case of meandering transport of the first-rising pans, which resembles the conventional chain drive, three horizontal and two vertical drive mechanisms are provided for stepwise propulsion of the first-rising pans.

Transport of the final-rising pans through the final-rising space in rows or layers has the advantage that the number of vertical drives to move the stacks of final-rising pans upward can be reduced, which correspondingly reduces the costs of manufacture and maintenance.

After the dough portions have been shaped, the first-rising pans enter a turning station where they are rotated by 180° so that the dough is tipped out. The shaped dough portions fall with the indented surface down onto a final-rising carrier on which they are transported during the final rising, which takes place within a final rising station which includes final rising carriers shown in FIGS. 5, 5a, 5b and 6 apparatus is claimed as essential to the invention both as an element independent of the first-rising region in accordance with the invention and in combination with the latter.

Transport of the first-rising carriers within a first-rising cart that can be moved into a first-rising room can likewise be meandering or, alternatively, in rows or layers. Here, again, in the case of row- or layer-wise transport the number of horizontal and vertical drive mechanisms can each be reduced by the same amount.

After the dough has risen, the final-rising carriers are again rotated by 180° so as to deposit the dough portions onto a baking sheet. On the latter they are transported to an oven in which the rolls or the like are baked in the conventional manner.

An additional advantage of the layer-by-layer transport of the first-rising pans through the first-rising region, or of the final-rising carriers through the final-rising cart, is that in each case any desired number of columns of carriers can be accommodated, which need not be arranged in even numbers as they must for meandering transport. When the rising-stage cart is only partially loaded with dough portions, in the case of a layered arrangement all the dough portions are in the upper layers, so that when the carriers are turned, the upper baking sheets are each completely filled while the lower sheets are empty. In the case of a meandering transport route, each of the sheets inserted into the final-rising cart is only partly filled.

As the dough portions are being transported to the oven they preferably pass through a spraying apparatus in which they are sprayed with water. It is also conceivable for the spraying to be done manually, as has previously been customary.

In association with the first-rising region there is preferably provided a magazine in which the emptied first-rising pans are collected, which can be removed as a unit and exchanged for another magazine with cleaned or dried first-rising pans. In this way the first-rising pans can be cleaned practically without interrupting the operation of the apparatus. When necessary, it is also possible to take out individual, particularly dirty first-rising pans for cleaning, replacing them with previously cleaned first-rising pans.

Within the magazine the movement of the first-rising pans is analogous to that in the first-rising region of the apparatus, i.e. either meandering or alternatively in rows or columns, and here again the number of vertical drive mechanisms can be reduced in the case of layer- or row-wise movement.

Within the final region the elongated, in particular board-like final-rising carriers to which the partially risen dough portions have been transferred are transported in a manner similar to that in the first-rising region. That is, in the final region the final-rising carriers are not connected to one another, but are closely stacked above one another and side by side.

BRIEF DESCRIPTION OF THE DRAWINGS

In the following an exemplary embodiment of the apparatus in accordance with the invention is described with reference to the attached drawings, wherein

FIGS. 4a–4c show the route followed by the final-rising carriers within the cart to receive final-rising carriers (the final-rising cart) shown schematically in FIG. 3;

FIG. 5 shows three final-rising carriers stacked one above another, in longitudinal section and enlarged;

FIG. 5a shows a final-rising carrier according to FIG. 5 in cross section, demonstrating its gondola-like suspension;

FIG. 5b shows a final-rising carrier according to FIG. 5 in end view;

FIGS. 7a–7g shows another, alternative mode of transport of the final-rising carriers within the cart to receive the final-rising carriers shown schematically in FIG. 3;

DESCRIPTION OF THE PREFERRED EMBODIMENTS

Figure 2:
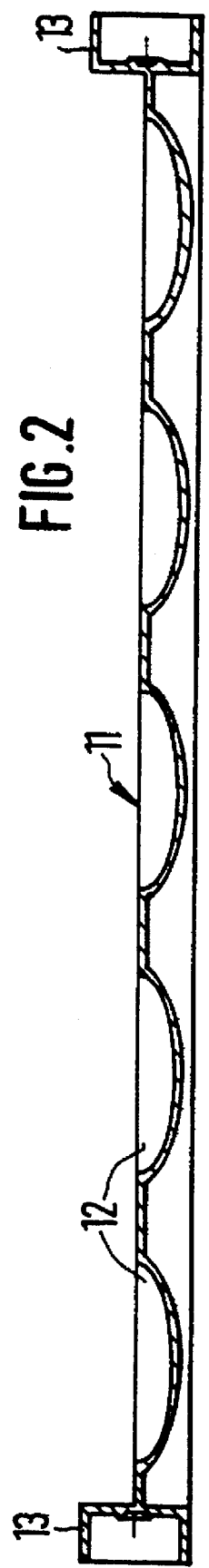
FIG. 2 shows a first-rising pan in longitudinal section.
Figure 2B:
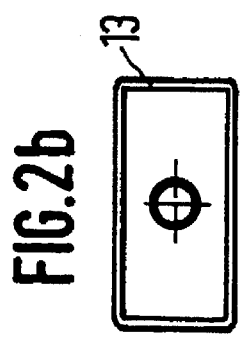
FIG. 2b shows the first-rising pan according to FIG. 2 in end view.
Figure 2A:
FIG. 2a shows the first-rising pan according to FIG. 2 in transverse cross section.
Figure 8D:
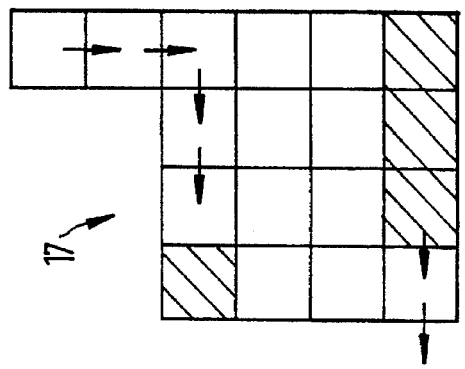
FIGS. 8a–8e shows a row-wise transport of the first-rising pans within the magazine shown in FIGS. 1 and 3.
Figure 8C:
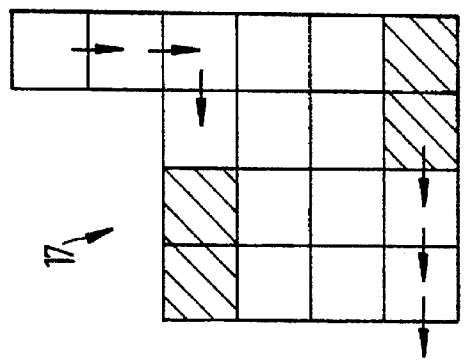
Figure 8B:
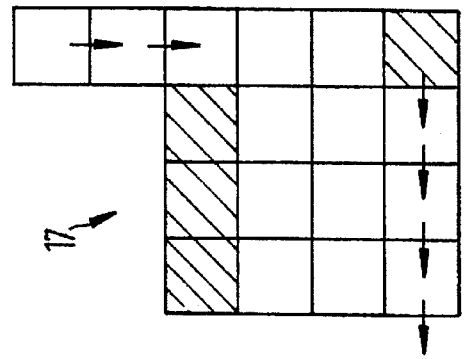
Figures 1, 8A:
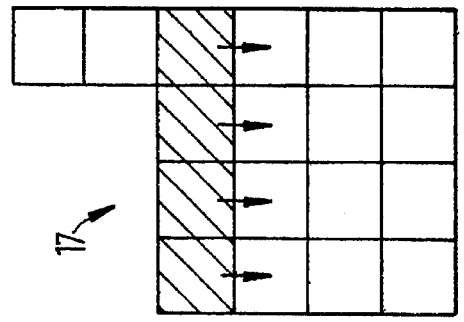
FIG. 1 is a schematic side view of a first-rising region in accordance with the invention, including the magazine for the emptied first-rising pans.
Figure 8A:
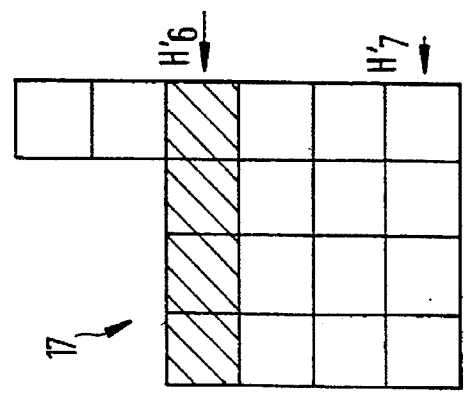

In FIG. 1 the first-rising region in accordance with the invention is shown in schematic side view. Here this region, identified by the reference numeral 10, is characterized by a plurality of first-rising pans 11 loosely stacked above one another and side by side, each first-rising pan 11 comprising several, e.g. five, trough-like depressions 12 (see FIGS. 2 and 2a), each of which receives one portion of dough. As shown in FIGS. 2, 2a and 2b, each first-rising pan 11 is constructed in one piece, e.g. of plastic. The area of contact at each end is defined by a rectangular frame 13, which forms the reciprocal abutment of the first-rising pans 11 stacked one over the other and side by side in the first-rising region 10; the corners of the rectangular frame 13 are preferably rounded.

Immediately behind the first-rising region 10 there is disposed a shaping station 14, followed by a mining station 15. The shaping station 14 comprises an indenter 16 to stamp a pattern onto the upper surface of the dough portions, which are still in the trough-like depressions 12 of the first-rising pans 11. The indenter 16 can either move up and down or, alternatively, be fixed, in which case the first-rising pans 11 with the dough portions they contain must be raised against the indenter 16 in order to stamp a pattern onto the upper surface of the dough portions. The latter embodiment is shown schematically in FIG. 1. Here the first-rising pan 11 just below the indenter 16 is raised by a lifting device V3.

In the turning station 15, which follows the shaping station 14, the first-rising pans are turned about their long axes by 180°, so that the partially risen dough portions fall out onto the final-rising carriers, not shown in FIG. 1. The emptied first-rising pans are transported on to a magazine 17, from which the first-rising pans 11 can subsequently be taken to be refilled with dough portions for the first rising.

The first-rising pans 11 are thus stacked loosely above and next to one another in a region 10, which in particular is delimited by a first-rising cabinet, and in the embodiment according to FIG. 1 they are transported along a meandering route through this region. To enable this transport, the first-rising pans are arranged so that they can be moved vertically up and down at least once, in the illustrated embodiment twice, and also horizontally when they are in the lowest and highest positions. The stacks of pans are raised by the lifting devices V1 and V2. Horizontal displacement of each individual pan, by an amount corresponding to the pan width, when the pan reaches the bottom of its stack is brought about by horizontal drive mechanisms H1 and H3. When a pan reaches the top of its stack, it is shifted horizontally by a horizontal drive mechanism H2.

In an embodiment in which the first-rising pans 11, except for those in the first stack, are moved downward through the first-rising region 10 in rows or layers, as will be described below, the lifting device V2 can be eliminated; in this case the first stack of pans is raised by the lifting device V1 and the horizontal displacement of the first-rising pans is brought about by the horizontal drive mechanisms H1 or H3 and H2.

The indenter 16 associated with the shaping station 14 operates in a horizontal transport section 18 along which the first-rising pans 11 are conveyed away from a delivery opening 20 of the first-rising cabinet 10. The horizontal movement in this region is brought about by the above-mentioned horizontal drive mechanism H3. After the dough portions have been indented, the first-rising pans are raised to the higher level of the mining station 15 by means of a lifting device or vertical drive mechanism V4. The movement into the turning station 15 is produced by a correspondingly disposed horizontal drive mechanism H4. Having been emptied by rotation over 180°, the first-rising pans are moved away from the region of the turning station 15 by means of a separate horizontal drive mechanism H5 and simultaneously transported to the above-mentioned magazine 17, in which the emptied first-rising pans are again stacked loosely one above the other and side by side.

The route by which the first-rising pans move through the magazine 17 can also be meandering, in which case the first-rising pans 11 are advanced in a stepwise manner by successive actuation of a horizontal drive mechanism H7 and a vertical drive mechanism V5, both acting at the bottom of the stacks, and of a horizontal drive mechanism H6 that acts at the top of the stacks. In an alternative transport mode, the first-rising pans 11 can be moved through the magazine 17 in layers or rows. In this case only the horizontal drive mechanisms H7 and H8 are required and the vertical drive mechanism V5 can be eliminated.

By means of a horizontal drive mechanism H8 that acts at the exit from the magazine 17, the pan-wise transport system leads back to the region of the first-rising process, initially to the vicinity of a dough-supply device 19 in which each empty first-rising pan is raised until it is just below a dough-supply opening, by means of the same lifting device V1 that also acts to feed the first-rising region. Having been loaded with dough portions, the first-rising pan is moved by the horizontal drive mechanism H1 into the stack of first-rising pans ascending into the first-rising region 10, where it is raised in a stepwise manner. As soon as the first-rising pan has reached the top position in this first ascending stack, the horizontal drive mechanism H2 in the upper region of the stack operates on it, shifting the pan horizontally to the right as shown in FIG. 1.

When passage through the first-rising region is of the meandering type, propulsion by the horizontal drive mechanism H2 serves to move the first-rising pan into the region of the adjacent, descending stack. After the pan has reached the lowest position in the stack, it is acted upon by the horizontal drive mechanism H3 situated there, which displaces the pan sideways into the next ascending stack. These steps are repeated until the first-rising pan has reached the delivery opening 20 of the first-rising region, e.g. the first-rising cabinet 10.

When, alternatively, the first-rising pans 11 pass through the first-rising region 10 in rows or layers, the above-mentioned horizontal drive mechanism H2 propels the first-rising pans 11 in the first, ascending stack to the right one after another, until the uppermost row in the first-rising region is completely filled, while the horizontal drive mechanism H3 is simultaneously pushing the completely filled lowest row, i.e. the lowest first-rising pans 11 in all the stacks of pans except the first stack, out of the first-rising region 10, so that all the bottom positions in the stacks of first-rising pans except for the first stack become free. Then all the first-rising pans in all the stacks but the first stack slide or fall down by one pan-height, so that the uppermost positions are again available for filling and the lowermost positions in the stacks of first-rising pans are again occupied.

The descent of the first-rising pans in both the first-rising region 10 and the magazine 17 is brought about by the pans' own weight. To prevent damage to the first-rising pans, in the bottom part of the descent sections shock absorbers or the like can be provided.

The directions of transport of the first-rising pans along the meandering route in the first-rising region 10 and the magazine 17 is indicated in FIG. 1 by the arrows 21 and 22. It will be immediately apparent that all the horizontal and vertical movements, being coupled to one another by the associated drive mechanisms H1, . . . and V1 . . . , preferably occur together. In this way the number of drive units can be minimized.

The number of drive units can additionally be reduced if the first-rising pans move through the first-rising region 10 and through the magazine 17 in rows or layers. As further explained below, with this transport mode all that is needed in the first-rising region, except for the propulsion of the first stack of pans, are the two horizontal drive mechanisms H2 and H3; additional vertical drive mechanisms such as V2 can be eliminated. Similarly, the vertical drive mechanism V5 in the magazine 17 can be eliminated if the first-rising pans 11 move in rows here. This reduction in number of drive units can reduce the costs of both manufacture and maintenance, and the risk that a drive will break down is also less.

FIG. 1 shows very clearly that both the first-rising region 10 and the magazine 17, which can be exchanged as a unit for the purpose of cleaning and drying the first-rising pans, can be constructed extremely compactly because of the loose stacking of the first-rising pans above one another in accordance with the invention, and in particular dead spaces can be avoided.

Figure 3:
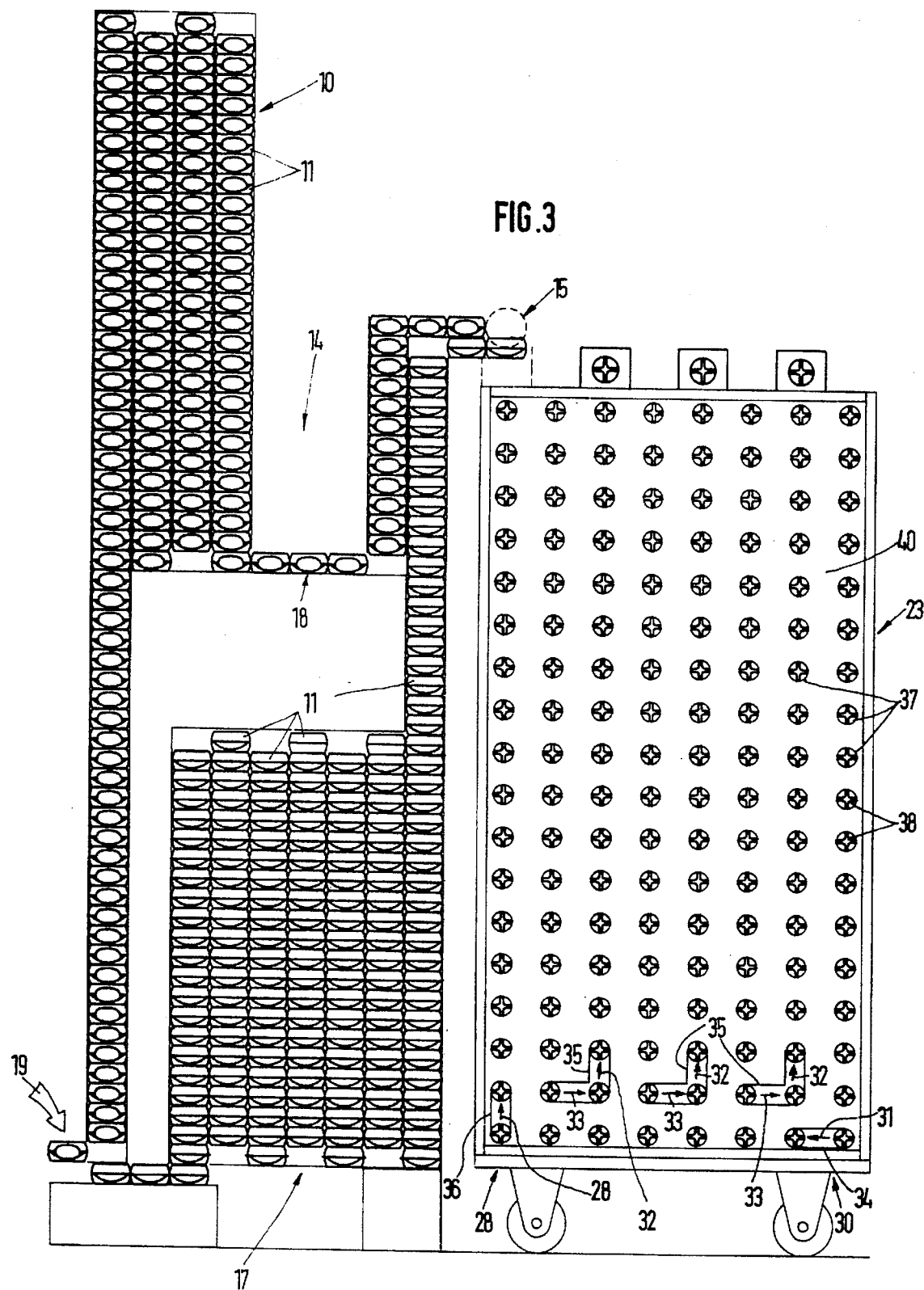
FIG. 3 shows the first-rising region of FIG. 1 together with a cart to receive final-rising carriers, likewise in schematic side view.

With reference to FIG. 3, the arrangement for the final-rising carriers on which the partially risen dough portions are deposited will be described.

As shown here, a plurality of the final-rising carriers, each board-shaped and mounted so as to be rotatable about its long axis, are stacked loosely above and next to one another in a final-rising cart, like the first-rising pans in the first-rising region 10 and the magazine 17. The arrangement is such that these carriers, like the first-rising pans in the first-rising region 10 and the magazine 17, move through the said final-rising cart, identified by the reference numeral 23, preferably on a meandering route or in rows or layers.

As shown in FIGS. 5, 5a and 5b, each of the board-like final-rising carriers 24 is suspended in gondola fashion at its two ends (see FIG. 5a), each of the pivot bearings 25 being formed within a rectangular plate 26. The plates 26, each shaped like a rectangular frame, also serve to guide the movement of the final-rising carriers through the final-rising cart 23 within the final-rising station. That is, the final-rising carriers abut against one another in the horizontal direction and rest on one another vertically by way of the bearing plates 26 at their ends. The corners of the bearing plates 26 are rounded, as shown in FIGS. 5a, 5b, to prevent the final-rising carriers from becoming jammed during their horizontal and vertical movement within the final-rising cart 23.

The bearing plates 26 are preferably made of plastic. The same applies to the board-like final-rising carriers 24. To achieve the gondola-like mounting of the final-rising carriers 24, the latter are disposed below the axis of rotation 27 defined by the associated pivot bearing 25 (see FIGS. 5 and 5a).

Drive mechanisms not shown here act on the final-rising carriers 24 by way of their ends, in order to lift and/or displace sideways final-rising carriers 24 arranged above one another and side by side. According to FIG. 3, the first stack 28 of final-rising carriers, positioned immediately following the turning device 15, is associated with a device 29 that acts on the bottom final-rising carrier in this stack in order to raise the stack of final-rising carriers by an amount corresponding to the height of one carrier, while the last stack 30 of final-rising carriers, i.e. the stack furthest away from the turning device 15, is associated with a device 31 that acts on the bottom final-rising carrier in this stack in order to shift this final-rising carrier to the side, displacing it horizontally by one carrier-width in the direction toward the first stack 28.

Between the first and the last stack of final-rising carriers, in the example embodiment shown in FIG. 3, there are disposed six additional stacks of final-rising carriers, for which there are provided devices 32 that act on the second-lowest final-rising carrier in every second stack in order to lift that stack, as well as devices 33 that act on the second-lowest final-rising carrier in the adjacent stack and serve to move that carrier into the place made available by the lifting of the first-mentioned stack. In this embodiment the stack of final-rising carriers next to the first stack 28 is provided with a device 33 for horizontal displacement of the second-lowest final-rising carrier in that stack, and the stack of final-rising carriers next to the last stack 30 is provided with a device 32 to raise that stack. The said vertical and horizontal drive mechanisms 29, 31, 32 and 33 comprise drive pins outside the cart (not shown) that engage the front ends or the bearing plates 26 of the final-rising carriers and are moved vertically and/or horizontally as described. To permit this placement to be brought about by the horizontal and vertical drive mechanisms 29, 31, 32 and 33, apertures must be provided in the boundary walls of the final-rising cart 23 next to the bearing plates 26. In FIG. 3 these apertures are identified by the reference numerals 34, 35 and 36. Each of the apertures in the region between the first and last stacks of final-rising carriers is L-shaped. The final-rising carriers in this exemplary embodiment are moved through the final-rising cart along a meandering route.

The final-rising carriers can also be moved through the final-rising cart in rows or layers, in analogy to that transport mode of the first-rising pans in the magazine 17 or the first-rising region 10. In this case, in particular, it is not necessary for an even number of stacks of final-rising carriers to be present in the cart. In such an embodiment, it is possible to eliminate both the horizontal drive mechanisms 33 and the vertical drive mechanisms 32 that were required in the embodiment with meandering transport. Furthermore, the apertures 34, 35 and 36 in the boundary walls of the cart 23 next to the bearing plates 26, which permit the operation of these mechanisms, are also unnecessary. Accordingly, the number of drive mechanisms can be greatly reduced.

Figure 6:
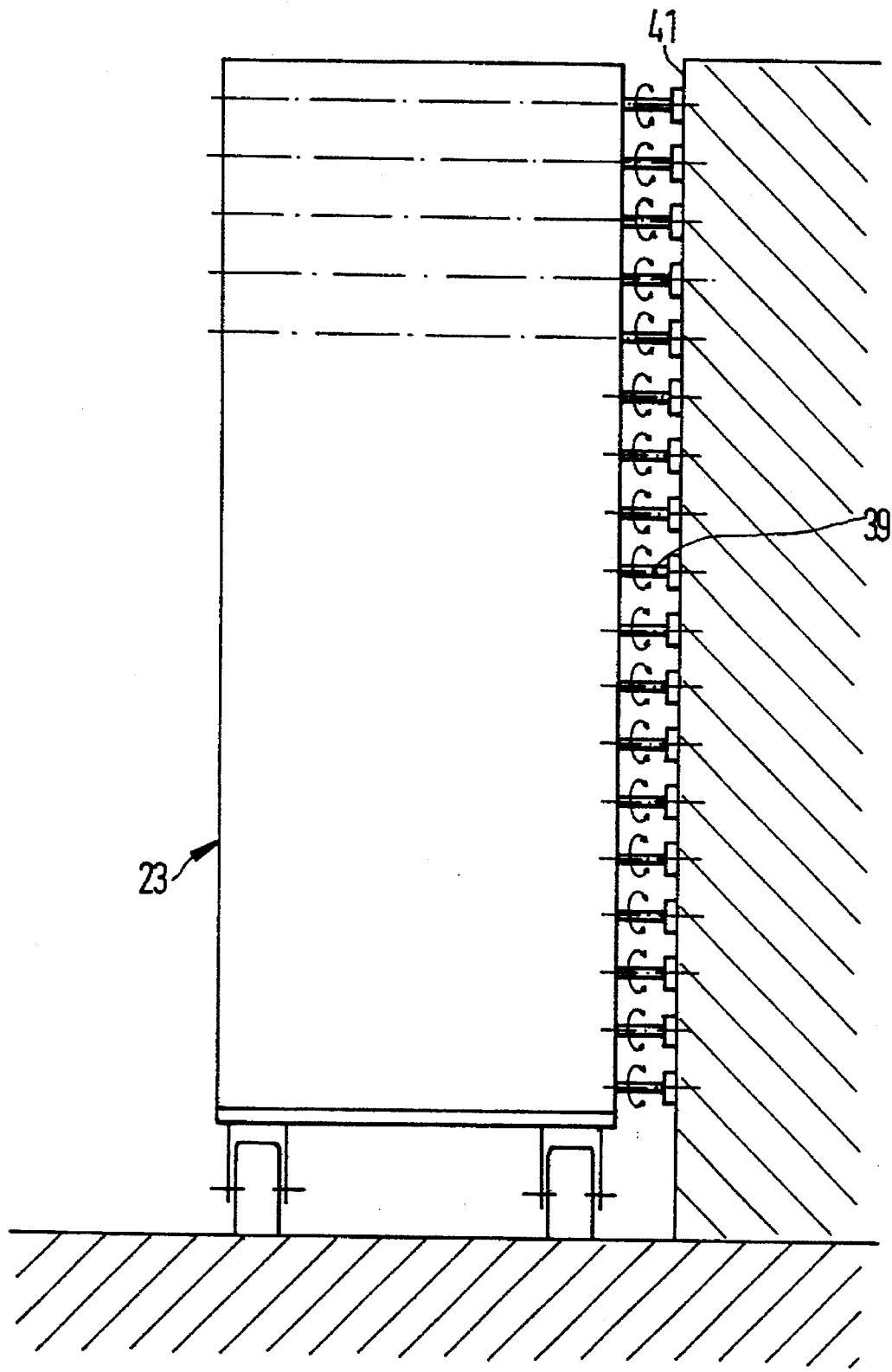
FIG. 6 is a schematic drawing to show the association between the cart to receive the final-rising carriers and a device for turning over the final-rising carriers.

In addition, in the said boundary walls of the final-rising cart 23 circular openings 37 are formed in the region of each pivot bearing 25 of a final-rising carrier. As shown in FIGS. 5 and 5b, there are disposed at the ends of the first-rising carriers 24 bearing pins 38 mounted in the associated bearing plates 26 in such a way that their outward-facing ends are accessible to turning elements 39 (see FIG. 6), which in the present case engage the bearing pins 38 in a form-fitting manner, by way of the said openings 37 in the side boundary walls of the final-rising cart 23. The side boundary wall shown in FIG. 3, with the openings 37 and the additional apertures 34, 35 and 36, is identified by the reference numeral 40. Having been loaded with partially risen dough portions, the final-rising cart 23 is rolled into a final-rising room, where it remains for about 20 minutes for the dough to finish rising. The dough portions are subsequently transferred to baking sheets. For this purpose the baking sheets 43 are pushed into the final-rising cart 23 between each pair of vertically adjacent final-rising carriers 24 (see FIG. 5). Then, as shown in FIG. 6, the final-rising cart 23 is moved next to a device with a plurality of carrier-turning elements 39, which extend through the said openings 37 in the side boundary wall 40 and act by way of a form-fitting engagement with the outward-facing ends of the bearing pins 38 of the final-rising carriers 24. By means of the turning elements 39 the final-rising carriers 24 are rotated by 180°, in which process the fully risen dough portions fall onto the baking sheets 43 inserted below the final-rising carriers 24. The baking sheets 43 are then, together with the fully risen dough portions, pulled out of the final-rising cart and transferred into the oven on a separate baking cart. During transport of the dough portions from the final-rising cart 23 to the oven, the dough portions can be sprinkled manually, in the conventional manner, or it is also conceivable for them to be transported by way of a stationary spray or shower installation in which they are sprayed or sprinkled. Additives such as starch or the like can be added to the spray water. A similar treatment can be given after baking. The dough portions are preferably sprayed while they are on the baking sheets.

FIGS. 4a–4c, 7a to 7g, 8a–8e and 9a–9d show routes for the movement of the first-rising pans 11 and the final-rising carriers 24 through the final-rising cart 23, the magazine 17 and the first-rising region 10.

In the meandering movement of final-rising carriers 24 according to FIGS. 4, a vertical drive mechanism 29 or 32 raises the first or the third, fifth and seventh stack of final-rising carriers, in each case by the height of a final-rising carrier. The vertical drive 29 acts on the lowest final-rising carrier in the first stack, and the vertical drive 32 acts on the second-lowest final-rising carriers in their respective stacks. The spaces thereby made free in the final-rising cart 23 are shaded in FIG. 4b. With the stacks in this configuration the uppermost final-rising carriers, which project out of the final-rising cart 23, are each pushed to the right by a horizontal drive mechanism 45, so that they are at the top of the next stack. The second-lowest final-rising carriers in the second, fourth and sixth stack are also shifted to the right, into the said free spaces. The latter movement is brought about by the horizontal drive mechanism numbered 33 in FIG. 4b. By means of an additional horizontal drive mechanism 31, the free space below the first stack of final-rising carriers is filled with a final-rising carrier. The resulting situation is shown in FIG. 4c. Here, again, the free spaces produced in the bottom part of the cart by the displacements of final-rising carriers just described are shaded. Each of these free spaces is now filled when the stack of final-rising carriers above it descends, as shown by the arrows 44 in FIG. 4c.

The sequence of movements described above and shown in FIGS. 4a–4c is repeated until the final-rising cart 23 is completely filled with dough portions, after which the cart is taken into a final-rising room.

FIGS. 7a–7g show schematically the route taken by the final-rising carriers when they are loaded into the final-rising cart in rows or layers. In FIG. 7a the reference numeral 29 again identifies the vertical drive mechanism that lifts the first stack of final-rising carriers by one carrier-height. The shaded squares represent empty final-rising carrier positions and the arrows indicate the directions in which the final-rising carriers 24 are displaced. FIG. 7a shows a situation in which the final-rising carriers 24 of the first stack are raised by one carrier-height, by means of the vertical drive mechanism 29, which frees the bottom position in the first stack of carriers. In FIG. 7b all the lowest final-rising carriers and the one at the top are shifted horizontally in opposite directions by the drive mechanisms 31 and 51, respectively, so that the last position in the bottom row is vacated and the first position is filled. At the same time, the final-rising carrier in the uppermost position is pushed one space over, toward the last stack of final-rising carriers. As shown in FIG. 7c, the first stack is again raised by one position, and in FIG. 7d the carriers in the bottom row are again pushed toward the first stack and those in the top row are pushed toward the last stack of final-rising carriers. According to FIG. 7e, the final-rising carriers 24 in the first stack are now raised yet again, after which the first three positions in the top row are filled with carriers and only one carrier remains in the bottom row, in the second stack. In the next step, this bottom carrier is shifted by one position toward the first stack of carriers, by means of the horizontal drive mechanism 31, while each of the carriers at the top is shifted one position to the right. In the last step, the final-rising carriers in all stacks except for the first are allowed to fall down by one position, and the final-rising carriers 24 in the first stack are displaced upward by one position, so that the initial situation shown in FIG. 7a is re-established.

This sequence of steps is repeated until the whole final-rising cart 23 is filled with dough portions. An advantage of this procedure for loading the final-rising cart, in comparison with the meandering route, is that there can be any number of stacks in the cart, and not necessarily an even number. Furthermore, it ensures that when the cart is only partially loaded, only the upper levels of the stacks of final-rising carriers are filled with dough portions, so that when the carriers are mined by 180° the upper baking sheets are fully occupied and the lower sheets are empty. In contrast, with the meandering mode of loading, when the cart is partially loaded all the sheets will be supplied with some dough portions but none will be fully occupied. In such a case the baking sheets 43 have to be filled by hand, because otherwise the oven cannot operate at full capacity. Especially when a large number of final-rising carriers are involved, this becomes a more significant problem.

FIGS. 8a–8e show schematically the process of loading first-rising pans 11 into the magazine 17 by rows or layers.

Figure 8E:
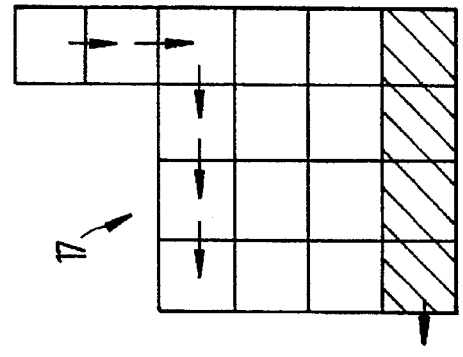

In FIG. 8a a horizontal drive mechanism H'7 operates on the bottom row of pans and a horizontal drive mechanism H'6 operates on the top row, each of them shifting the first-rising pans 11 in the corresponding row one position toward the last stack of pans. In FIG. 8a the top row in the stacks of first-rising pans is free, as indicated by the shading, whereas the bottom row is filled with pans. In the series of steps of FIGS. 8a–FIG. 8e, the top row is filled with first-rising pans while the bottom row is emptied, one pan at a time. FIG. 8e shows a state in which the top row of the stacks of first-rising pans in the magazine 17 is completely full and the bottom row is completely empty. In the next step all the first-rising pans 11, in all the stacks, fall down by one position, restoring the situation of FIG. 8a. By repetition of this sequence the first-rising pans 11 are moved through the magazine 17. It is advantageous here that only two horizontal drive mechanisms, H'6 and H'7, are needed to move the first-rising pans.

Figure 9D:
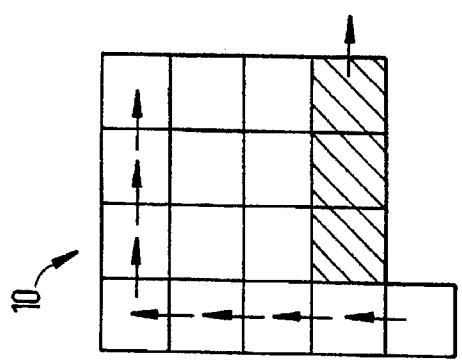
FIGS. 9a–9d shows a row-wise transport of the first-rising pans within the first-rising region, in particular first-rising cabinet, shown in FIGS. 1 and 3.
Figure 9C:
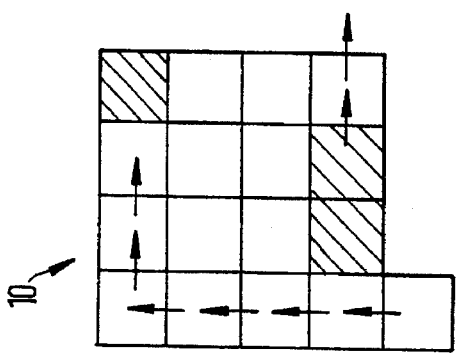
Figure 9B:
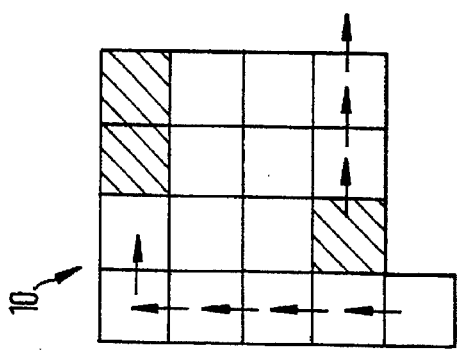
Figure 9A:
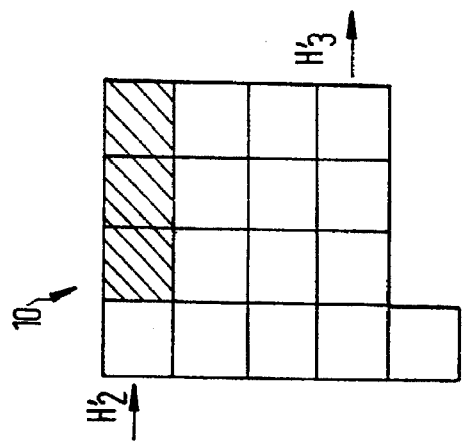
Figures 1, 9A:
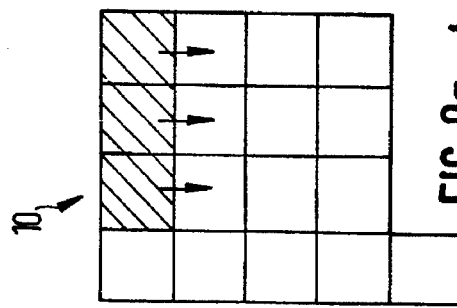

Finally, FIGS. 9a–9d show schematically the row- or layer-wise movement of first-rising pans 11 in the first-rising region 10. Here, again, the empty positions are indicated by shading and the displacements of the first-rising pans, by arrows. Only the two horizontal drive mechanisms H'2 and H'3 shown in FIG. 9a are needed to move the first-rising pans in the first-rising region, by acting on the top and bottom rows of the stacks. FIG. 9 does not show the vertical drive mechanism V1 that raises the first-rising pans. In the starting situation, FIG. 9a, all positions in the top row are free except for the first stack of pans. The uppermost first-rising pan 11 in this first stack is then moved by one position toward the last stack of first-rising pans in the first-rising region 10, while the lowest pans, in the bottom row of pans in the first-rising region 10, are shifted in the direction of the exit from the first-rising region 10. This sequence is continued until the top row of pans is completely filled and the bottom row is empty except for the first stack of pans (FIGS. 9b–9d). In the next step all the first-rising pans 11 in all the stacks except for the first stack fall down by one pan-height, so that the top row is empty except for the first stack and the bottom row is again filled with first-rising pans. Here, again, by repeating this process all the first-rising pans 11 can be moved through the first-rising region 10.

The routes for movement of the first-rising pans and final-rising carriers are not restricted to those stated above and described here with reference only to particular examples. Other conceivable movement routes are entirely within the scope of the invention.

The previously described construction of the magazine 17 and of the final-rising cart 23 and the movement routes described for those structures are also claimed as essential to the invention in connection with other areas of application, e.g. in the areas of storage and/or fabrication technology in general. Accordingly, the described constructions and movement routes are not limited to application in bakeries.

All the characteristics disclosed in the application documents are claimed as essential to the invention, to the extent that they are new to the state of the art singly or in combination.

We claim:

1. Apparatus for processing dough prior to baking comprising a station housing a plurality of loose elongated dough carriers having uniform length and width; said station including guidance means to keep said carriers aligned vertically in self-supporting stacks to form layers of carriers and side-by-side to form a row of said stacks, and to enable said carriers to move vertically by gravity one carrier height at a time in at least some of said stacks from a top said layer to a lower layer;

a first drive mechanism arranged and operable to displace carriers in the top layer horizontally one carrier width at a time;

a second drive mechanism arranged and operable to displace carriers in the lower layer horizontally one carrier width at a time; and, means to automatically coordinate the operations of said first and second mechanisms with vertical movements of said carriers in said stacks to move said carriers progressively through said station layer by layer and row by row.

2. The apparatus defined in claim 1 wherein the first and second drive mechanisms displace carriers in said top and lower layers in the same direction.

3. The apparatus defined in claim 1 wherein the first and second drive mechanisms displace carriers in said top and lower layers in opposite directions.

4. The apparatus of claim 1 further comprising an entrance in said station to enable a carrier to begin movement through layers and rows and an exit in said station to discharge the carrier from the station following such movement.

5. The apparatus of claim 1 which further comprises a third drive mechanism arranged and operable to displace carriers in a first stack at one end of said row vertically one carrier height at a time from said lower layer to said top layer.

6. The apparatus of claim 2 further comprising at least one vertical drive mechanism arranged and operable to displace carriers in a first set of alternate stacks one carrier height at a time from said lower layer to said top layer, and wherein carriers in the remaining second set of alternate stacks are free to move by gravity one carrier height at a time from said top layer to said lower layer.

7. The apparatus of claim 1, wherein carriers in adjacent stacks are free to move vertically downward in unison one carrier height at a time.

8. The apparatus of claim 1 further comprising a vertical drive mechanism arranged and operable to displace carriers in a first stack one carrier height at a time from said lower layer to said top layer, and wherein the carriers in each other stack are free to move uniformly and downward by gravity one carrier height at a time.

9. The apparatus of claim 7, wherein the drive mechanisms are coordinated to move each carrier sequentially through all of the stacks in the row and sequentially through all of the layers in each stack between the top layer and the lower layer.

10. The apparatus of claim 9, where the station is a first-rising station, each carrier is capable of carrying a dough portion, the carriers exit from the last stack, and wherein the apparatus further comprises a plunger arranged and operable to shape and indent each dough portion following the exit of its respective carrier from the first-rising station.

11. The apparatus of claim 10 which further comprises a dough portion carrier arranged and operable to convey carriers containing dough portions away from said plunger, and a turning station arranged and operable to receive and turn over each such carrier so as to turn over and place each indented dough portion on said carrier.

12. The apparatus of claim 1, wherein the station is a final rising station, the carriers are flat and journaled at each end in the station to be rotatable about their long axes, and the final-rising station is adapted to receive a separate baking sheet between each pair of superimposed flat carriers, each of which sheets is positioned to receive portions of risen dough discharged from the flat carrier above the sheet upon rotation of the said above flat carrier.

13. Apparatus for final rising of dough which comprises:

a cart having end walls and housing a plurality of loose, elongated dough carriers having uniform length and width which are positioned one upon another to form a self-supporting stack of such carriers and side-by-side to form a row of such stacks said carriers in at least some of said stacks being capable of moving downward by gravity one carrier height at a time; each carrier comprising an elongated board-like member having opposing ends and capable of supporting at least one portion of dough and a pair of rectangular support members, one of said rectangular support members attached to each end of said board-like member and pivotally supporting said board-like member to enable the board-like member to rotate about a longitudinal axis; each rectangular support member having flat upper, lower and side surfaces configured to abut opposing such surfaces of adjacent carriers to enable vertical stacking and displacement of the carriers as well as horizontal displacement of the carriers by contact of the abutting surfaces.

14. The apparatus of claim 13, wherein the cart is capable of receiving and supporting a baking sheet below each board-like member and between the pair of rectangular support members attached to the board-like members.

15. The apparatus of claim 13, wherein one said end wall defines a plurality of apertures positioned laterally opposite pivotally supported ends of the board-like members to enable a turning tool to enter the apertures and engage and rotate said pivotally supported ends.

16. Apparatus for treating dough prior to baking which comprises:

a first rising station including a housing and a plurality of loose, elongated dough pans having uniform length and width and arranged in a row of stacks of such pans, wherein the pans in each stack rest one upon another and abut pans in adjacent stacks inside-by-side relation to form layers of such pans, said pans in at least some of said stacks being free to move vertically downward by gravity one pan height at a time from a top said layer to a lower layer;

a first drive mechanism arranged and operable to displace the pans in the top layer by pan-to-pan contact sideways one pan width at a time;

at least one additional drive mechanism arranged and operable in coordination with said first drive mechanism to move such pans progressively through said first rising station from a first stack at one end of said row to exit from said station from said lower row;

a plunger arranged and operable to shape each dough portion on each said pan following exit of the pan from said lower layer;

a turning station adapted to engage and turn over each pan following shaping of a dough portion in the pan by said plunger so as to empty the dough portion from the turned over pan;

a magazine including guidance means to receive empty pans from the turning station and to arrange them in a row of stacks of such pans, wherein the pans in each stack rest one upon the other and abut pans in adjacent stacks in side-by-side relation to form layers of such pans, said pans in at least some of said stacks being free to move vertically downward by gravity one pan height at a time from a top layer to a lower layer;

at least one drive mechanism arranged and operable to move said pans through said magazine one pan-height at a time in said stacks and one pan-width at a time between said stacks to discharge the pans one at a time to said first stack of said first rising station.

* * * * *